United States Patent
Imanishi et al.

(10) Patent No.: US 12,135,259 B2
(45) Date of Patent: Nov. 5, 2024

(54) COMPRESSOR SYSTEM, COMPRESSOR, AND REFRIGERATION CYCLE APPARATUS

(71) Applicant: Mitsubishi Electric Corporation, Tokyo (JP)

(72) Inventors: Toshiki Imanishi, Tokyo (JP); Yuji Takamura, Tokyo (JP); Kohei Tatsuwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 306 days.

(21) Appl. No.: 17/767,584

(22) PCT Filed: Dec. 20, 2019

(86) PCT No.: PCT/JP2019/050134
§ 371 (c)(1),
(2) Date: Apr. 8, 2022

(87) PCT Pub. No.: WO2021/124557
PCT Pub. Date: Jun. 24, 2021

(65) Prior Publication Data
US 2023/0152185 A1     May 18, 2023

(51) Int. Cl.
*G01M 13/045* (2019.01)
*F04B 49/10* (2006.01)
(Continued)

(52) U.S. Cl.
CPC ........... *G01M 13/045* (2013.01); *F04B 49/10* (2013.01); *F04B 51/00* (2013.01); *F04C 29/00* (2013.01)

(58) Field of Classification Search
CPC ....... G01M 13/045; F04B 49/10; F04B 51/00; F04C 29/00; F04C 2270/12; F04C 2270/16; F04C 2270/80; G01B 7/00; F16C 17/246
See application file for complete search history.

(56) References Cited

U.S. PATENT DOCUMENTS 10,502,212 B2 * 12/2019 Lee .................... F04C 29/0085
10,871,184 B2 * 12/2020 Oda ....................... F04D 29/026
(Continued)

FOREIGN PATENT DOCUMENTS

JP   H03-239901 A   10/1991
JP   H05-001880 U    1/1993
(Continued)

OTHER PUBLICATIONS

International Search Report dated Mar. 10, 2020, issued in corresponding International Patent Application No. PCT/JP2019/050134 (and English Machine Translation).
(Continued)

*Primary Examiner* — Giovanni Astacio-Oquendo
*Assistant Examiner* — Martin Walter Braunlich
(74) *Attorney, Agent, or Firm* — Posz Law Group, PLC

(57) ABSTRACT

A compressor system includes a compressor including a bearing supporting a rotating shaft; a sensor configured to measure an index value correlated with a movement of the rotating shaft being made while the compressor is in operation; and a wear-detecting unit configured to detect a degree of wear of the bearing based on a measured value obtained by the sensor. The bearing is a plain bearing, and has a plurality of air gaps arranged at intervals in a circumferential direction such that wear of the bearing changes a positional relationship between an inner circumferential surface of the bearing and the plurality of air gaps and eventually changes a shape of the inner circumferential surface thereof. The wear-detecting unit detects the degree of wear of the bearing based on a change in the measured value caused by a change in the shape of the inner circumferential surface of the bearing.

16 Claims, 20 Drawing Sheets

(51) Int. Cl.
F04B 51/00 (2006.01)
F04C 29/00 (2006.01)

(56) References Cited

U.S. PATENT DOCUMENTS

| | | | | |
|---|---|---|---|---|
| 11,137,179 B2* | 10/2021 | Furugaki | ................ | F04B 49/10 |
| 2022/0252065 A1* | 8/2022 | Yamamoto | ............. | F04B 49/02 |

FOREIGN PATENT DOCUMENTS

| | | | |
|---|---|---|---|
| JP | H08-285565 A | 11/1996 | |
| JP | 2008-075625 A | 4/2008 | |
| JP | 2017-083060 A | 5/2017 | |
| JP | 2019-105356 A | 6/2019 | |
| WO | WO-2016143186 A1 * | 9/2016 | ............. F04C 18/02 |

OTHER PUBLICATIONS

Office Action dated Jan. 27, 2024 issued in corresponding CN Patent Application No. 201980101681.1 (and English machine translation).

* cited by examiner

FIG. 4

|  | FREQUENCY HAVING ANOMALOUS PEAK |
|---|---|
| BEARING | N × f | f : ROTATION FREQUENCY
N : NUMBER OF AIR GAPS IN BEARING

FIG. 10

| BEARING HAVING ABNORMALITY | FREQUENCY HAVING ANOMALOUS PEAK |
|---|---|
| ONLY MAIN BEARING | $N \times f$ |
| ONLY ORBITING BEARING | $N \times f$ |
| MAIN BEARING AND ORBITING BEARING | $2 \times N \times f$ | f : ROTATION FREQUENCY
N : NUMBER OF AIR GAPS IN EACH OF MAIN EARING AND ORBITING BEARING

FIG. 11

| BEARING HAVING ABNORMALITY | FREQUENCY HAVING ANOMALOUS PEAK |
|---|---|
| ONLY MAIN BEARING | $N \times f$ |
| ONLY ORBITING BEARING | $M \times f$ |
| MAIN BEARING AND ORBITING BEARING | $N \times f, M \times f$ | f : ROTATION FREQUENCY
N : NUMBER OF AIR GAPS IN EACH OF MAIN EARING AND VIBRATING BEARING
M : NUMBER OF AIR GAPS IN ORBITING BEARING

FIG. 12

| BEARING HAVING ABNORMALITY | FREQUENCY HAVING ANOMALOUS PEAK |
|---|---|
| ONLY MAIN BEARING (WEAR BY $\delta 2$) | $N \times f$ |
| ONLY MAIN BEARING (WEAR BY $\delta 1$) | $2 \times N \times f$ |
| ONLY ORBITING BEARING (WEAR BY $\delta 2$) | $M \times f$ |
| ONLY ORBITING BEARING (WEAR BY $\delta 1$) | $2 \times M \times f$ |
| MAIN BEARING (WEAR BY $\delta 2$), ORBITING BEARING (WEAR BY $\delta 2$) | $N \times f, M \times f$ |
| MAIN BEARING (WEAR BY $\delta 1$), ORBITING BEARING (WEAR BY $\delta 2$) | $(2 \times N) \times f, M \times f$ |
| MAIN BEARING (WEAR BY $\delta 2$), ORBITING BEARING (WEAR BY $\delta 1$) | $N \times f, (2 \times M) \times f$ |
| MAIN BEARING (WEAR BY $\delta 1$), ORBITING BEARING (WEAR BY $\delta 1$) | $(2 \times N) \times f, (2 \times M) \times f$ | f : ROTATION FREQUENCY
N : NUMBERS OF FIRST AIR GAPS AND SECOND AIR GAPS IN MAIN BEARING
M : NUMBERS OF FIRST AIR GAPS AND SECOND AIR GAPS IN ORBITING BEARING

COMPRESSOR SYSTEM, COMPRESSOR, AND REFRIGERATION CYCLE APPARATUS

CROSS REFERENCE TO RELATED APPLICATION

This application is a U.S. national stage application of PCT/JP2019/050134 filed on Dec. 20, 2019, the contents of which are incorporated herein by reference.

TECHNICAL FIELD

The present disclosure relates to a compressor system including a compressor having a bearing that supports a rotating shaft, and also relates to a compressor and a refrigeration cycle apparatus.

BACKGROUND ART

Hitherto, a device that detects wear of a bearing included in a hermetic compressor has been disclosed by Patent Literature 1. According to Patent Literature 1, a plurality of metal pieces are provided around a rotating shaft with a small air gap interposed between the rotating shaft and the metal pieces. The plurality of metal pieces are covered with an insulating mold, such as resin, and are thus formed into a cylindrical part, which is provided around the rotating shaft. The mold forming the cylindrical part and interposed between the rotating shaft and the metal pieces serves as a bearing. If the bearing wears away, the rotating shaft comes into contact with the metal pieces, which changes the electric current flowing through the rotating shaft. In the device disclosed by Patent Literature 1, such wear of the bearing is to be detected based on the change in the electric current.

CITATION LIST

Patent Literature

Patent Literature 1: Japanese Unexamined Patent Application Publication No. 3-239901

SUMMARY OF INVENTION

Technical Problem

The device disclosed by Patent Literature 1 has the following problem. To enable the detection of wear of the bearing, the compressor needs to include the cylindrical mold that covers the plurality of metal pieces. Such a design complicates the configuration of the compressor.

To solve the above problem, the present disclosure provides a compressor system including a compressor in which wear of a bearing is detectable with a simple configuration, and also provides a compressor and a refrigeration cycle apparatus.

Solution to Problem

A compressor system according to an embodiment of the present disclosure includes a compressor including a bearing, the bearing supporting a rotating shaft; a sensor configured to measure an index value correlated with a movement of the rotating shaft, the movement being made while the compressor is in operation; and a wear-detecting unit configured to detect a degree of wear of the bearing based on a measured value obtained by the sensor. The bearing is a plain bearing and has a plurality of air gaps arranged at intervals in a circumferential direction such that wear of the bearing changes a positional relationship between an inner circumferential surface of the bearing and the plurality of air gaps and eventually changes a shape of the inner circumferential surface of the bearing. The wear-detecting unit detects the degree of wear of the bearing based on a change in the measured value that is caused by a change in the shape of the inner circumferential surface of the bearing.

Advantageous Effects of Invention

According to the above embodiment of the present disclosure, the degree of wear of the bearing is detectable by utilizing the fact that the progress of wear changes the positional relationship between the inner circumferential surface of the bearing and the plurality of air gaps and eventually changes the shape of the inner circumferential surface of the bearing. The change in the shape of the inner circumferential surface of the bearing is caused by the plurality of air gaps provided in the bearing. Thus, the degree of wear of the bearing can be detected with a simple configuration realized by providing a plurality of air gaps in the bearing.

BRIEF DESCRIPTION OF DRAWINGS

FIG. 4 summarizes a frequency at which an anomalous peak appears in the result of frequency analysis performed by an analyzing unit included in the compressor system according to Embodiment 1.

FIG. 10 summarizes a relationship, in Pattern 1, between the bearing having abnormality and the frequency having an anomalous peak to be identified by frequency analysis in a compressor system according to Embodiment 3.

FIG. 11 summarizes a relationship, in Pattern 2, between the bearing having abnormality and the frequency having an anomalous peak to be identified by frequency analysis in the compressor system according to Embodiment 3.

FIG. 12 summarizes a relationship, in Pattern 3, between the bearing having abnormality and the frequency having an anomalous peak to be identified by frequency analysis in the compressor system according to Embodiment 3.

DESCRIPTION OF EMBODIMENTS

Figure 1:
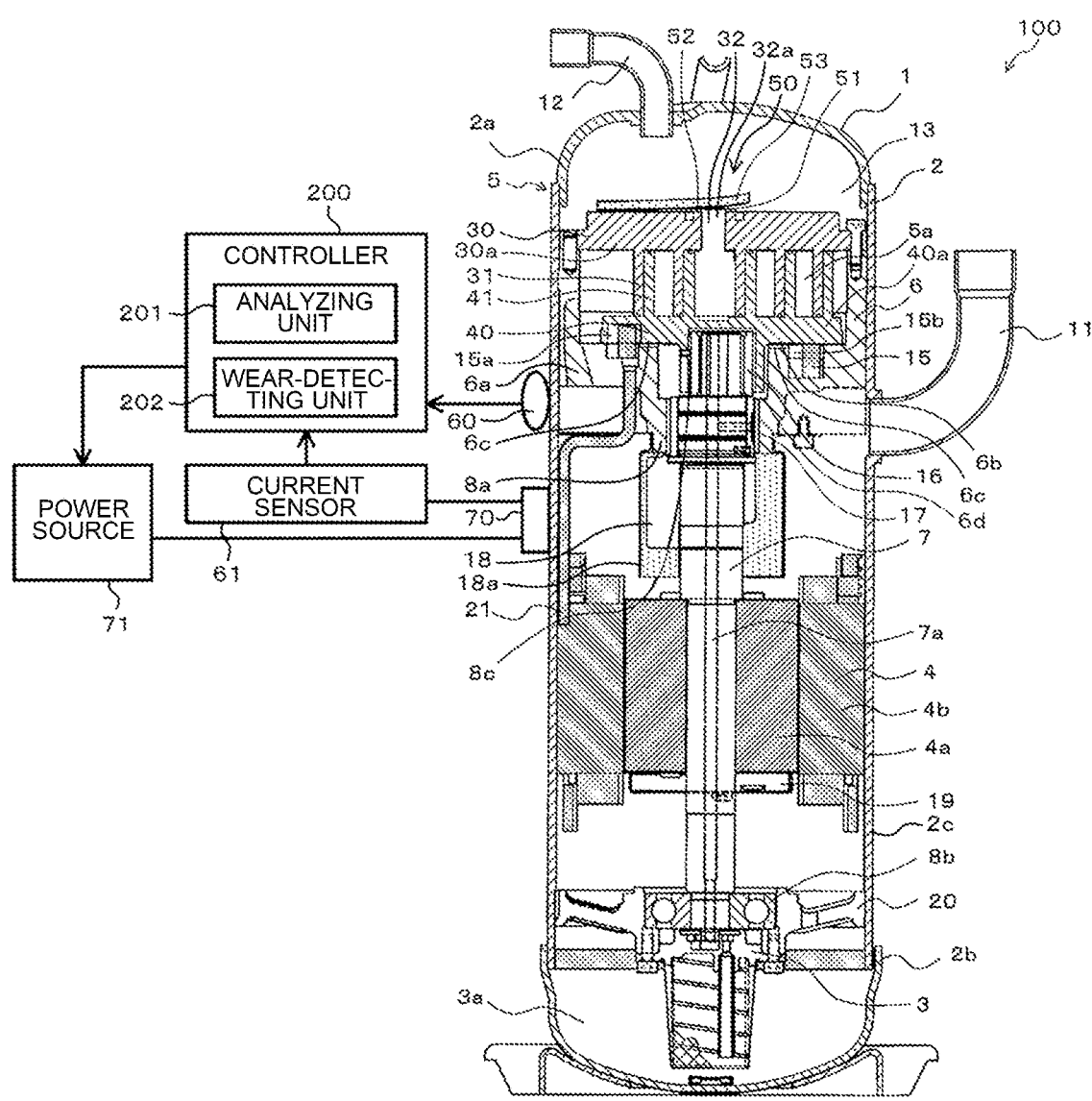
FIG. 1 is a schematic sectional view of a compressor system according to Embodiment 1.

Compressors according to embodiments will now be described with reference to the drawings. In the drawings to be referred to below, the same reference signs denote the same or equivalent elements, which applies throughout the following description of embodiments. The forms of individual elements described throughout the entirety of this specification are only exemplary and do not limit the forms of the elements thereto. Elements illustrated in the drawings may not necessarily be to scale. For easy understanding, terms indicating directions (such as "upper", "lower", "right", "left", "front", and "rear") will be used accordingly. Such terms, however, are only for convenience of description and do not limit the arrangements or orientations of the apparatus and individual elements thereof.

Embodiment 1

[Configuration of Compressor 100]

FIG. 1 is a schematic sectional view of a compressor system according to Embodiment 1. The compressor system includes a compressor 100 and a controller 200. The controller 200 includes a function of detecting wear of bearings included in the compressor 100. The compressor 100 is, for example, a scroll compressor having a shell filled with low-pressure refrigerant. The compressor 100 is applicable to refrigeration cycle apparatuses, to be described below, for refrigeration uses or air-conditioning uses: such as a refrigerator, a freezer, a vending machine, an air-conditioning apparatus, a freezing apparatus, and a water heater. The compressor 100 suctions refrigerant circulating through a refrigerant circuit included in a refrigeration cycle apparatus, compresses the refrigerant into high-temperature high-pressure refrigerant, and discharges the high-temperature high-pressure refrigerant.

First, a configuration of the compressor 100 will be described. As illustrated in FIG. 1, the compressor 100 includes a shell 2, an oil pump 3, a motor 4, a compressing mechanism unit 5, a frame 6, and a rotating shaft 7. The compressor 100 further includes a suction pipe 11, a discharge pipe 12, a sub frame 20, an oil-draining pipe 21, a vibration sensor 60, a current sensor 61, and a power-supplying unit 70.

(Shell 2)

The shell 2 includes a middle shell 2c, an upper shell 2a, and a lower shell 2b. The upper shell 2a is provided at the top of the middle shell 2c. The lower shell 2b is provided at the bottom of the middle shell 2c. The shell 2 forms the outer shell of the compressor 100. The shell 2 has a bottomed circular cylindrical shape, with an oil sump 3a being provided at the bottom thereof. The shell 2 houses the oil pump 3, the motor 4, the compressing mechanism unit 5, the frame 6, the rotating shaft 7, the sub frame 20, the oil-draining pipe 21, and other relevant elements. The middle shell 2c forms a circular cylindrical circumferential wall of the shell 2. The upper end of the middle shell 2c of the shell 2 is closed by the upper shell 2a, which has a dome shape. The lower end of the middle shell 2c of the shell 2 is closed by the lower shell 2b. The upper shell 2a of the shell 2 and the compressing mechanism unit 5 define a discharge chamber 13 therebetween. The discharge chamber 13 provides a high-pressure space. The discharge chamber 13 is positioned above the compressing mechanism unit 5 and receives refrigerant compressed by and discharged from the compressing mechanism unit 5.

(Oil Pump 3)

The oil pump 3 housed in the shell 2 pumps up oil from the oil sump 3a. The oil pump 3 is positioned at the bottom inside the shell 2. The oil pump 3 supplies the oil pumped up from the oil sump 3a to lubrication objects, such as bearings included in the compressor 100, so that the lubrication objects are lubricated. The oil that has been pumped up by the oil pump 3 and has lubricated an orbital bearing 8c is, for example, stored in an internal space 6d, which is provided inside the frame 6. The oil then flows through oil-feeding grooves 6c, which extend radially in a thrust bearing 6b to be described below. The oil having flowed through the oil-feeding grooves 6c flows into an Oldham-ring space, in which an Oldham ring 15 is provided. Thus, the oil lubricates the Oldham ring 15. The Oldham-ring space has Oldham grooves 15a and 15b to be described below. The Oldham-ring space is connected to one end of the oil-draining pipe 21. The oil in the Oldham-ring space flows through the oil-draining pipe 21 and returns into the oil sump 3a.

(Motor 4)

The motor 4 housed in the shell 2 is positioned between the frame 6 and the sub frame 20 and rotates the rotating shaft 7. The motor 4 includes a stator 4b and a rotor 4a. The stator 4b is fixed to the inner circumferential wall of the middle shell 2c. The rotor 4a is positioned on the inner circumferential side of the stator 4b. The stator 4b rotates the rotor 4a with electric power received from the outside of the compressor 100. The stator 4b includes, for example, a stack of iron cores around which coils of different phases are wound. The rotating shaft 7 is fixed to the rotor 4a. The rotating shaft 7 transmits a rotational driving force generated by the motor 4 to an orbiting scroll 40. When electric power is supplied to the stator 4b, the rotor 4a rotates together with the rotating shaft 7. The rotation speed of the rotating shaft 7 is changeable by operating the motor 4 under, for example, inverter control.

(Compressing Mechanism Unit 5)

The compressing mechanism unit 5 housed in the shell 2 compresses fluid that is suctioned into the shell 2 through the suction pipe 11. The fluid may be, for example, refrigerant. The compressing mechanism unit 5 has a compression chamber 5a and an outlet 32. The refrigerant is compressed in the compression chamber 5a, and the compressed refrigerant is discharged through the outlet 32. The compressing mechanism unit 5 includes a fixed scroll 30 and the orbiting scroll 40. The fixed scroll 30 is fixed to the shell 2. The orbiting scroll 40 rotates about (i.e., orbits) the fixed scroll 30. The fixed scroll 30 is, for example, provided at the upper end of the frame 6, which has a cylindrical shape, in such a manner as to cover an opening of the frame 6. The fixed scroll 30 is fixed to the frame 6 with fastening parts such as bolts. While the above description relates to a case where the fixed scroll 30 is fixed to the frame 6, the fixed scroll 30 may alternatively be fixed directly to the middle shell 2c of the shell 2, without being fixed to the frame 6.

The fixed scroll 30 cooperates with the orbiting scroll 40 in such a manner as to compress the refrigerant. The fixed scroll 30 is positioned face to face with the orbiting scroll 40. The fixed scroll 30 includes an end plate 30a and a scroll portion 31. The scroll portion 31 extends downward from the lower surface of the end plate 30a. The scroll portion 31 projects toward the orbiting scroll 40 from a surface of the end plate 30a that faces toward the orbiting scroll 40. The scroll portion 31 is a projection having a spiral shape in a cross section taken along a plane parallel to the end plate 30a.

The end plate 30a defines the compression chamber 5a in combination with the scroll portion 31 of the fixed scroll 30 and a scroll portion 41, to be described below, of the orbiting scroll 40. The end plate 30a is fixedly provided inside the shell 2, with the outer circumferential surface thereof facing the inner circumferential surface of the middle shell 2c, and with the outer circumferential edge of the lower surface thereof being in contact with the upper end face of the frame 6. The end plate 30a has a disc shape. The outlet 32 extends through a central portion of the end plate 30a. The refrigerant compressed in the compression chamber 5a is discharged through the outlet 32. The outlet 32 is provided at the exit thereof with a discharge valve mechanism 50. The discharge valve mechanism 50 includes a valve seat 52, a reed valve 51, and a reed valve retainer 53. The valve seat 52 is provided around an open end 32a at the exit of the outlet 32. The reed valve 51 is a leaf spring provided on the valve seat 52 and opens and closes the outlet 32 by the effect of the pressure difference between the inside and the outside. The reed valve retainer 53 is provided on the valve seat 52 and limits the maximum opening degree of the reed valve 51. The discharge valve mechanism 50 prevents the backflow of the refrigerant discharged from the open end 32a at the exit of the outlet 32.

The orbiting scroll 40 is positioned face to face with the fixed scroll 30. The orbiting scroll 40 is eccentric with respect to the fixed scroll 30. The orbiting scroll 40 includes an end plate 40a and the scroll portion 41. The scroll portion 41 extends upward from the upper surface of the end plate 40a. The scroll portion 41 projects toward the fixed scroll 30 from a surface of the end plate 40a that faces toward the fixed scroll 30. The scroll portion 41 is a projection having a spiral shape in a cross section taken along a plane parallel to the end plate 40a. The end plate 40a defines the compression chamber 5a in combination with the scroll portion 41 of the orbiting scroll 40 and the scroll portion 31 of the fixed scroll 30. The end plate 40a has a disc shape and undergoes an orbital motion inside the frame 6 with the rotation of the rotating shaft 7. A thrust load acting in the axial direction on the orbiting scroll 40 is borne by the frame 6. A surface of the end plate 40a that is opposite the surface having the scroll portion 41 serves as the thrust bearing 6b. The orbiting scroll 40 is prevented from undergoing a spinning motion by the Oldham ring 15 and rotates about the fixed scroll 30. In other words, the orbiting scroll 40 undergoes an orbital motion with respect to the fixed scroll 30.

The Oldham ring 15 is provided on the thrust bearing 6b of the orbiting scroll 40 and prevents the orbiting scroll 40 from undergoing a spinning motion. The Oldham ring 15 that prevents the spinning motion of the orbiting scroll 40 enables the orbital motion of the orbiting scroll 40. The Oldham ring 15 has catches, which are not illustrated. The catches project from the upper and lower surfaces, respectively, of the Oldham ring 15 in such a manner as to extend orthogonally to each other. The catches of the Oldham ring 15 are fitted in each of the Oldham groove 15a provided in the orbiting scroll 40 and the Oldham groove 15b provided in the frame 6.

The fixed scroll 30 and the orbiting scroll 40 are housed in the middle shell 2c, with the scroll portion 31 and the scroll portion 41 thereof that are positioned face to face being in mesh with each other. The space produced between the scroll portion 31 of the fixed scroll 30 and the scroll portion 41 of the orbiting scroll 40 that are in mesh with each other serves as the compression chamber Sa. When the orbiting scroll 40 undergoes the orbital motion with the rotation of the rotating shaft 7, the refrigerant, which is in a gas state, is compressed in the compression chamber Sa.

(Frame 6)

The frame 6 has a cylindrical shape, with the outer circumference thereof being fixed to the shell 2. The compressing mechanism unit 5 is positioned on the inner circumferential side of the frame 6. The frame 6 holds the orbiting scroll 40 of the compressing mechanism unit 5. The frame 6 bears the thrust-bearing load, which occurs while the compressor 100 is in operation, at the thrust bearing 6b of the orbiting scroll 40. The frame 6 supports the rotating shaft 7 with the aid of a main bearing 8a such that the rotating shaft 7 is rotatable. The frame 6 has a suction port 6a. Refrigerant in a gas state is suctioned through the suction pipe 11 into the shell 2 and flows through the suction port 6a into the compressing mechanism unit 5.

A sleeve 17 is provided between the frame 6 and the main bearing 8a. The sleeve 17 has a cylindrical shape. The sleeve 17 absorbs misalignment that may occur between the frame 6 and the rotating shaft 7.

(Rotating Shaft 7)

The rotating shaft 7 is connected to the motor 4 and to the orbiting scroll 40 and transmits the rotational force generated by the motor 4 to the orbiting scroll 40. A portion of the rotating shaft 7 that is above the rotor 4a is rotatably supported by the main bearing 8a, which is attached to the frame 6. A portion of the rotating shaft 7 that is below the rotor 4a is rotatably supported by a counterbearing 8b, which is provided in the sub frame 20. The rotating shaft 7 is provided at the lower end thereof with the oil pump 3 that pumps up the oil in the oil sump 3a. The rotating shaft 7 has an oil passage 7a. The oil passage 7a runs through the inside of the rotating shaft 7. The oil pumped up by the oil pump 3 flows upward through the oil passage 7a.

The rotating shaft 7 is provided around the outer circumference of the upper portion thereof with a slider 16. The slider 16 has a cylindrical shape. The slider 16 is positioned on the inner wall of a bottom portion of the orbiting scroll 40. The orbiting scroll 40 is attached to the rotating shaft 7 with the slider 16 interposed therebetween. Thus, the orbiting scroll 40 rotates with the rotation of the rotating shaft 7. The orbital bearing 8c is interposed between the orbiting scroll 40 and the slider 16.

The rotating shaft 7 is provided with a first balancer 18. The first balancer 18 is fixed to the upper portion of the rotating shaft 7 by, for example, shrink fitting. The first balancer 18 is positioned between the frame 6 and the rotor 4a. The first balancer 18 is housed in a balancer cover 18a. The rotor 4a is provided at the lower end thereof with a second balancer 19. The second balancer 19 is positioned between the rotor 4a and the sub frame 20. The first balancer 18 and the second balancer 19 cancel out any imbalance that may be caused by the orbiting scroll 40 and the slider 16.

(Main Bearing 8a and Orbital Bearing 8c)

The main bearing 8a and the orbital bearing 8c are each a plain bearing. A plain bearing refers to a bearing including a fixed cylindrical metal or resin part and a rotatable metal part which move relative to each other in such a manner as to form a fluid film of oil between sliding surfaces thereof.

(Suction Pipe 11)

The suction pipe 11 is a pipe through which refrigerant in a gas state is suctioned into the shell 2. The suction pipe 11 is attached to the circumferential wall of the shell 2. Specifically, the suction pipe 11 is connected to the middle shell 2c.

(Discharge Pipe 12)

The discharge pipe 12 is a pipe through which the refrigerant compressed in the compressing mechanism unit 5 is discharged to the outside of the shell 2. The discharge pipe 12 is attached to the top of the shell 2. Specifically, the discharge pipe 12 is connected to the upper shell 2a. The discharge pipe 12 connects the discharge chamber 13, provided inside the shell 2, and the refrigerant circuit, provided outside the shell 2, to each other.

(Sub Frame 20)

The sub frame 20 housed in the shell 2 is positioned below the motor 4 and is fixed to the inner circumferential surface of the middle shell 2c. The sub frame 20 supports the rotating shaft 7 with the aid of the counterbearing 8b such that the rotating shaft 7 is rotatable. The counterbearing 8b is a ball bearing but is not limited thereto. The counterbearing 8b may be a bearing of any other kind. The counterbearing 8b is fitted in a counterbearing-receiving portion, which is fixed to a central portion of the sub frame 20.

(Oil-Draining Pipe 21)

The oil-draining pipe 21 is connected at one end thereof to the Oldham-ring space as described above, thereby being connected to a space between the frame 6 and the orbiting scroll 40. The other end of the oil-draining pipe 21 extends downward in the shell 2 and is connected to a space between the frame 6 and the sub frame 20. The oil-draining pipe 21 allows an excessive portion of the oil flowing into the space between the frame 6 and the orbiting scroll 40 to be discharged into the space between the frame 6 and the sub frame 20. The oil discharged into the space between the frame 6 and the sub frame 20 flows through the sub frame 20 and returns into the oil sump 3a.

(Vibration Sensor 60)

The vibration sensor 60 is attached to the shell 2 and measures the vibration of the compressor 100 that is in operation. The vibration sensor 60 is attached to the outer circumferential surface of the shell 2 and at the same height as the main bearing 8a or the orbital bearing 8c. The vibration sensor 60 measures the vibration occurring in the radial direction of the shell 2. The vibration sensor 60 is, for example, a piezoelectric acceleration pickup. The vibration sensor 60 is connected to the controller 200. The acceleration measured by the vibration sensor 60 is taken as the vibration value of the compressor 100, and the vibration value is transmitted to the controller 200.

(Current Sensor 61)

The current sensor 61 measures the value of an electric current flowing through the compressor 100: specifically, the value of an electric current flowing through the motor 4. The current value measured by the current sensor 61 is transmitted to the controller 200.

(Power-Supplying Unit 70 and Power Source 71)

The power-supplying unit 70 supplies electric power to the motor 4 and includes a power-supplying terminal (not illustrated) and other relevant elements. The power-supplying terminal extends through the shell 2. Electric power is supplied from a power source 71 to the motor 4 through the power-supplying terminal.

[Description of Controller 200]

The controller 200 includes an analyzing unit 201 and a wear-detecting unit 202. The analyzing unit 201 performs frequency analysis of the current value measured by a sensor that measures an index value correlated with the movement of the rotating shaft 7 that is made while the compressor 100 is in operation. In Embodiment 1, the sensor is the vibration sensor 60 or the current sensor 61. The analyzing unit 201 performs frequency analysis of the vibration value measured by the vibration sensor 60 or the current value measured by the current sensor 61. The wear-detecting unit 202 detects the degree of wear of a bearing of interest based on the result of the analysis performed by the analyzing unit 201. The main bearing 8a and the orbital bearing 8c are the objects of wear detection. Details of the processes to be performed by the analyzing unit 201 and the wear-detecting unit 202 will be described separately below.

The controller 200 is a piece of dedicated hardware or a CPU (central processing unit) that executes programs stored in a memory. A CPU is also referred to as a processing device, an arithmetic device, a microprocessor, a microcomputer, or a processor.

If the controller 200 is a piece of dedicated hardware, the controller 200 is any of the following: for example, a single circuit, a composite circuit, an ASIC (application-specific integrated circuit), an FPGA (field-programmable gate array), and a combination of the foregoing. Individual functions of the controller 200 may be realized by respective pieces of hardware, or such functions may all be realized by a single piece of hardware.

If the controller 200 is a CPU, the functions to be executed by the controller 200 are realized by software, firmware, or a combination of software and firmware. The software and the firmware are each written as programs and are stored in a memory. The CPU realizes the functions of the controller 200 by reading the programs stored in the memory and executing the programs. The memory is, for example, a non-volatile or volatile semiconductor memory such as a RAM, a ROM, a flash memory, an EPROM, or an EEPROM.

Some of the functions of the controller 200 may be realized by dedicated hardware, while the others may be realized by software or firmware.

[Description of Operation of Compressor 100]

An operation of the compressor 100 will now be described. When electric power is supplied from the power source 71 through the power-supplying unit 70 to the stator 4b, the stator 4b generates a magnetic field. The magnetic field causes the rotor 4a to rotate. That is, when electric power is supplied to the stator 4b, the rotor 4a generates a torque, which rotates the rotating shaft 7 supported by the main bearing 8a and the counterbearing 8b. The orbiting scroll 40 connected to the rotating shaft 7 is prevented from spinning by the Oldham ring 15 but undergoes an orbital motion. Through the foregoing process, the compressor 100 changes the capacity of the compression chamber 5a provided by the combination of the scroll portion 31 of the fixed scroll 30 and the scroll portion 41 of the orbiting scroll 40.

With the orbital motion of the orbiting scroll 40, the gas-state refrigerant suctioned into the shell 2 through the suction pipe 11 flows into the compression chamber 5a. As the refrigerant advances toward the center of the compression chamber 5a, the refrigerant is gradually compressed. The refrigerant thus compressed flows into the outlet 32 provided in the end plate 30a of the fixed scroll 30, opens the discharge valve mechanism 50, and is discharged through the discharge pipe 12 to the refrigerant circuit provided outside the compressor 100.

In the compressor 100, the imbalance caused by the motions of the orbiting scroll 40 and the Oldham ring 15 is cancelled out by the first balancer 18 attached to the rotating shaft 7 and the second balancer 19 attached to the rotor 4a. Furthermore, in the compressor 100, lubricating oil stored at the bottom of the shell 2 is supplied through the oil passage 7a provided in the rotating shaft 7 to relevant sliding parts including the main bearing 8a, the counterbearing 8b, and other relevant thrust surfaces.

[Operation of Main Bearing 8a]

When the compressor 100 is activated, the sleeve 17 undergoes a relative motion on the inner circumferential surface of the main bearing 8a with oil being present therebetween. Specifically, the sleeve 17 undergoes a relative motion on the inner circumferential surface of the main bearing 8a while being pushed against the inner circumferential surface in the direction of the resultant of the centrifugal force exerted by the first balancer 18 and the gas load received from the compressing mechanism unit 5. In this relative motion, the sleeve 17 rotates while being in contact with the inner circumferential surface of the main bearing 8a with oil being present therebetween. In a section orthogonal to the rotating shaft 7, the sleeve 17 having a cylindrical shape is in contact with the inner circumferential surface of the main bearing 8a at a single point, which moves in the circumferential direction in the relative motion with the rotation of the rotating shaft 7.

[Operation of Orbital Bearing 8c]

When the compressor 100 is activated, the slider 16 undergoes a relative motion on the inner circumferential surface of the orbital bearing 8c with oil being present therebetween. Specifically, the slider 16 undergoes a relative motion on the inner circumferential surface of the orbital bearing 8c while being pushed against the inner circumferential surface in the direction of the resultant of the centrifugal force exerted by the first balancer 18 and the gas load received from the compressing mechanism unit 5. In this relative motion, the slider 16 rotates while being in contact with the inner circumferential surface of the orbital bearing 8c with oil being present therebetween. In a section orthogonal to the rotating shaft 7, the slider 16 having a cylindrical shape is in contact with the inner circumferential surface of the orbital bearing 8c at a single point, which moves in the circumferential direction in the relative motion with the rotation of the rotating shaft 7.

[Wear Detection]

If, for example, the amount of oil that is discharged together with the refrigerant to the outside of the compressor 100 increases, a lack of oil occurs in the compressor 100. In such a situation, the sleeve 17 and the inner circumferential surface of the main bearing 8a directly come into contact with each other, leading to wear over the entire inner circumference of the main bearing 8a. This also applies to the orbital bearing 8c. If the rotating shaft 7 and the inner circumferential surface of the orbital bearing 8c directly come into contact with each other, wear occurs over the entire inner circumference of the orbital bearing 8c. That is, the direct contact between the bearing and the cylindrical part provided on the inner side of the bearing causes wear of the bearing.

In Embodiment 1, the degree of wear of the bearing is to be detected. Specifically, in Embodiment 1, abnormal abrasion is to be detected, which occurs when the wear of the bearing progresses and the amount of abrasion exceeds a specified value. The specified value may be defined in any way. In the following description, in terms of reliability, the specified value is set at the amount of tolerable wear that represents the limit of the amount of wear.

Embodiment 1 relates to a case where only one of the main bearing 8a and the orbital bearing 8c is the object of detection of abnormal abrasion. The configuration of the bearing that is the object of detection of abnormal abrasion is the same between the case of the main bearing 8a and the case of the orbital bearing 8c. Hence, the bearing to be the object of abnormal abrasion is generally denoted as "bearing 80", and a specific configuration of the bearing 80 will now be described, followed by a method of detecting abnormal abrasion. The case where both the main bearing 8a and the orbital bearing 8c are the objects of detection of abnormal abrasion will be described in Embodiment 3.

[Detailed Configuration of Bearing 80]

(Outline of Bearing 80)

Figure 2:
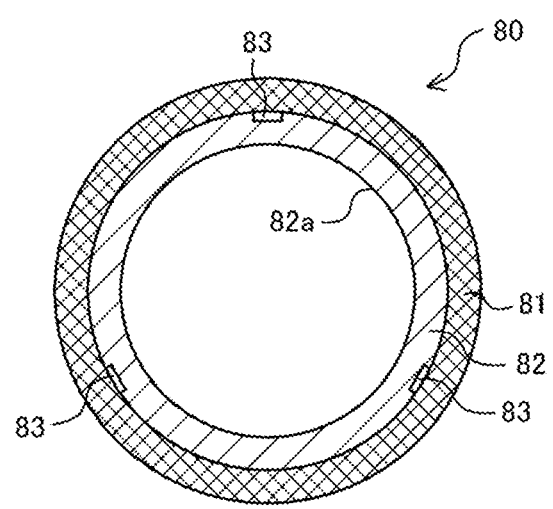
FIG. 2 is a schematic sectional view of a bearing included in a compressor according to Embodiment 1.
Figure 3:
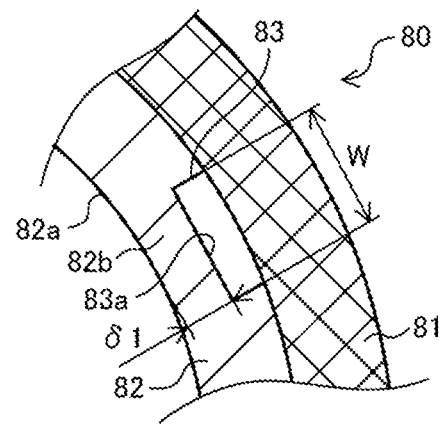
FIG. 3 is an enlarged schematic sectional view of a part of FIG. 2, including an air gap and peripheral elements.

FIG. 2 is a schematic sectional view of the bearing included in the compressor according to Embodiment 1. FIG. 3 is an enlarged schematic sectional view of a part of FIG. 2, including an air gap and peripheral elements.

As illustrated in FIG. 2, the bearing 80 has a cylindrical shape and is formed of, for example, two parts. Specifically, the bearing 80 includes a cylindrical backing metal part 81 and a cylindrical alloy part 82. The alloy part 82 is provided on the inner circumferential side of the backing metal part 81. The metal forming the backing metal part 81 has a greater tensile strength than the metal forming the alloy part 82. The alloy part 82 is made of a highly slidable material, such as a copper alloy or an aluminum alloy.

The outer circumferential surface of the alloy part 82 has a plurality of air gaps 83. The plurality of air gaps 83 are arranged at regular intervals in the circumferential direction. While a case where three air gaps 83 are provided is herein taken as an example, at least two air gaps 83 are to be provided. Providing the plurality of air gaps 83 reduces the strength of the alloy part 82. Therefore, if the bearing 80 is formed of the alloy part 82 alone, the bearing 80 may be broken under some load. In this respect, the bearing 80 is formed as a combination of the alloy part 82 and the backing metal part 81. If satisfactory strength is provided, the bearing 80 may be formed of the alloy part 82 alone.

The air gaps 83 are each a recess provided in the outer circumferential surface of the alloy part 82. Referring to FIG. 3, the bottom surface, 83a, of the recess and the inner circumferential surface, 82a, of the bearing 80 is at a first distance 81 from each other. The first distance 81 is set at the amount of tolerable wear, which is several tens of micrometers, for example. Alternatively, the first distance 81 may be greater than the amount of tolerable wear. The first distance 81 is settable at a value greater than the amount of tolerable wear as follows.

As the inner circumferential surface 82a of the bearing 80 wears by being in contact with the cylindrical part provided on the inner side of the bearing 80, the thickness of a portion 82b between the bottom surface 83a of the recess serving as the air gap 83 and the inner circumferential surface 82a of the alloy part 82 (see FIG. 3, hereinafter referred to as "wear-tolerable-thickness portion 82b") is reduced. The wear occurs over the entirety of the inner circumferential surface 82a of the alloy part 82. Herein, however, the description focuses on the wear-tolerable-thickness portion 82b. As the wear progresses, the wear-tolerable-thickness portion 82b becomes thinner and more fragile. In such a situation, if the bearing load acting on the bearing 80 is excessive, the wear-tolerable-thickness portion 82b collapses into the air gap 83. Therefore, the sum of: the thickness of the wear-tolerable-thickness portion 82b at which the wear-tolerable-thickness portion 82b collapses into the air gap 83; and the amount of tolerable wear; may be set as the first distance 81. With such a setting, if the bearing load acting on the bearing 80 is excessive, the collapse of the wear-tolerable-thickness portion 82b may occur when the inner circumferential surface 82a of the bearing 80 has worn by the tolerable amount. In other words, such a setting prevents the occurrence of a situation where the wear-tolerable-thickness portion 82b collapses before the amount of tolerable wear for the inner circumferential surface 82a of the bearing 80 is reached.

A method of detecting abnormal abrasion according to Embodiment 1 utilizes, as to be described in detail below, a situation where the wear-tolerable-thickness portion 82b wears away to make the air gap 83 continuous with the space on the inner side of the bearing 80. In other words, if the air gap 83 becomes continuous with the space on the inner side of the bearing 80, the shape of the inner circumferential surface of the bearing 80 changes, which is utilized for the detection of abnormal abrasion. The collapse of the wear-tolerable-thickness portion 82b into the air gap 83 also changes the shape of the inner circumferential surface of the bearing 80 and is therefore useful for the detection of abnormal abrasion.

[Principle of Abnormal Abrasion Detection]

A principle of detection of wear occurring in the bearing 80 will now be described.

While the compressor 100 is in operation, the rotating shaft 7 rotates. In a section orthogonal to the rotating shaft 7, as described above, the rotating cylindrical part provided on the inner side of the bearing 80 is in contact with the inner circumferential surface 82a of the bearing 80 at a single point. The contact point moves relative to the inner circumferential surface 82a with oil being present therebetween. If any incident occurs such as a backflow of liquid refrigerant into the compressor 100 that may dilute the oil or a reduction in the amount of oil in the compressor 100, the bearing 80 and the cylindrical part directly come into contact with each other, resulting in wear of the inner circumferential surface 82a of the bearing 80. As the wear of the inner circumferential surface 82a of the bearing 80 progresses, the wear-tolerable-thickness portion 82b may eventually wears away.

Before the wear-tolerable-thickness portion 82b wears away, the state of the contact point between the cylindrical part and the inner circumferential surface 82a of the bearing 80 is stable. Therefore, a stable oil film is formed between the cylindrical part and the inner circumferential surface 82a of the bearing 80. If the wear-tolerable-thickness portion 82b wears away and the air gap 83 becomes continuous with the space on the inner side of the bearing 80, a sudden change occurs in the shape of the inner circumferential surface 82a of the bearing 80, which deteriorates the formation of the oil film. Consequently, the vibration of the rotating shaft 7 increases. Accordingly, the vibration value and the current value increase. In Embodiment 1, such changes in the vibration value and the current value caused by the change in the shape of the inner circumferential surface 82a of the bearing 80 are utilized for the detection of abnormal abrasion.

Herein, the first distance 81, which corresponds to the thickness of the wear-tolerable-thickness portion 82b, is set at the amount of tolerable wear, as described above. Therefore, the wear-away of the wear-tolerable-thickness portion 82b indicates that abrasion of an amount exceeding the amount of tolerable wear has occurred on the inner circumferential surface 82a of the bearing 80. Accordingly, if changes in the vibration value and the current value are detectable, abnormal abrasion is detectable.

[Circumferential Width W of Air Gap 83]

To perform the above detection of abnormal abrasion, the air gap 83 needs to have a circumferential width W that is set as follows. As described above, the bearing 80 and the cylindrical part provided on the inner side thereof are in contact with each other at a single point during operation, and the contact point moves in the circumferential direction in the relative motion with the rotation of the rotating shaft 7. The sampling interval [s] in the frequency analysis of the vibration value or the current value needs to be shorter than time t1, which is required for the contact point to move by the circumferential width W of the air gap 83. The reciprocal of the time t1 is regarded as the frequency range for the frequency analysis. It is known that frequency analysis needs to be based on a sampling frequency fs that is 2.56 times the frequency range. Furthermore, the maximum frequency that is settable as the sampling frequency fs is specific to the analyzer to be used for frequency analysis. Herein, a maximum frequency of 51.2 [kHz] is defined as the sampling frequency. Accordingly, the time t1 is expressed as $2.56/51.2 \times 10^3 = 0.051 \times 10^{-3}$.

Considering the above, the circumferential width W of the air gap 83 is calculated as follows, on condition that the width W is made longer than a length obtained through the multiplication of the velocity, V, of the rotating shaft 7 by the time t1 required for the contact point to move by the circumferential width W of the air gap 83:

$$W \text{ [mm]} \leq t1 \text{ [s]} \times V \text{ [mm/s]}$$

where velocity V=inside diameter of bearing $80 \times \pi \times$ rotation speed r, and time $t1 = 0.05 \times 10^{-3}$ [s].

Hence, letting the minimum rotation speed r of the rotating shaft 7 be 30 [rps] and the inside diameter, D, of the bearing 80 be 40 [mm], the following holds:

$$W \geq 0.05 \times 10^{-3} \times 40 \times \pi \times 30 = 0.1884.$$

Thus, in the above example, the circumferential width W of the air gap 83 is set at 0.1884 [mm] or greater. The upper limit of the width W is defined as follows. After the occurrence of wear by δ1, the total circumferential length of portions of the inner circumferential surface of the bearing 80 that are effective as a bearing is reduced by a length corresponding to the number, N, of air gaps 83 times the width W [mm]. Therefore, if the width W is too long, the bearing 80 may lose the function as a bearing after the occurrence of wear by δ1 or greater, leading to a failure of the compressor. Hence, the maximum width that does not cause the failure is regarded as the upper limit of the circumferential width W of the air gap 83.

[Analyzing Unit 201 and Wear-Detecting Unit 202]

FIG. 4 summarizes a frequency at which an anomalous peak appears in the result of frequency analysis performed by the analyzing unit included in the compressor system according to Embodiment 1.

In the bearing 80, the plurality of air gaps 83 are arranged at regular intervals. Letting the number of air gaps 83 that are arranged at regular intervals be N, as summarized in FIG. 4, an anomalous peak appears in abnormal time at a frequency calculated as the product of the number N of air gaps provided in the bearing 80 and the rotation frequency, f, of the motor 4. Frequency analysis in Embodiment 1 is assumed to be performed by fast Fourier transform (FFT). In FFT, which is based on Fourier transform, it is premised that the signal to be analyzed has periodicity in every time range. Therefore, since the air gaps 83 are arranged at regular intervals, peak values can be obtained through frequency analysis. Herein, the signal to be analyzed refers to the change in temporal data on the current value that is caused by the air gaps 83 or the change in temporal data on the vibration value that is caused by the air gaps 83.

Figure 5:
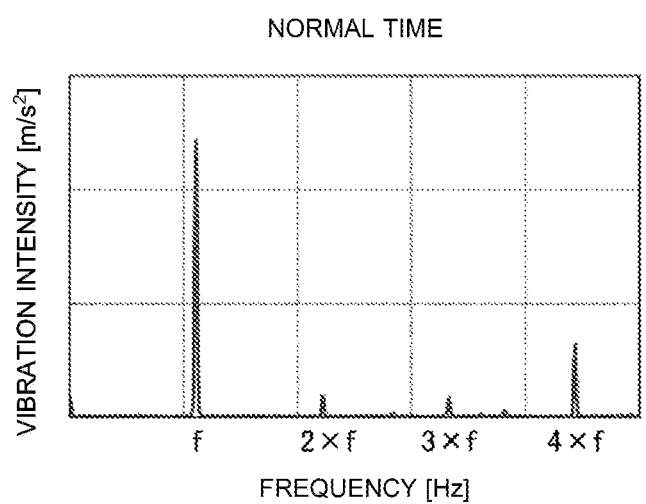
FIG. 5 exemplifies the result of frequency analysis in normal time that is obtained by the analyzing unit of the compressor system according to Embodiment 1.
Figure 6:
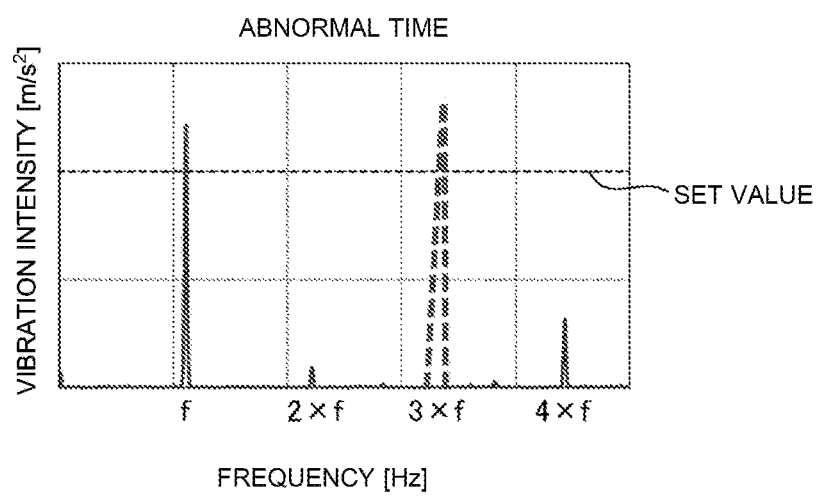
FIG. 6 exemplifies the result of frequency analysis in abnormal time that is obtained by the analyzing unit of the compressor system according to Embodiment 1.

FIG. 5 exemplifies the result of frequency analysis in normal time that is obtained by the analyzing unit of the compressor system according to Embodiment 1. FIG. 6 exemplifies the result of frequency analysis in abnormal time that is obtained by the analyzing unit of the compressor system according to Embodiment 1. In FIGS. 5 and 6, the horizontal axis represents frequency [Hz], and the vertical axis represents vibration intensity [m/s]. The rotation frequency of the motor 4 is denoted by f. Vibration intensity is regarded as acceleration. While FIGS. 5 and 6 exemplify the results of frequency analysis for the vibration value, similar results are obtained in frequency analysis for the current value. The result of frequency analysis in abnormal time exemplified by FIG. 6 is for a case where the number of air gaps is 3.

In normal time, as illustrated in FIG. 5, the first-order component of the rotation frequency f of the motor 4 is to be detected as a major peak. In abnormal time, that is, if abrasion by the amount of tolerable wear occurs, as illustrated in FIG. 6, an anomalous peak whose value exceeds a set value appears at a frequency of 3×f, which is the product of "3" denoting the number of air gaps 83 and "f" denoting the rotation frequency.

Accordingly, if the result of frequency analysis that is obtained by the analyzing unit 201 contains a peak whose value exceeds a preset value at the frequency of 3×f, the wear-detecting unit 202 determines that abnormality has occurred.

The detection of such abnormality by the wear-detecting unit 202 indicates that the life of the compressor 100 may expire soon. Therefore, the controller 200 controls the compressor 100 such that the maximum rotation frequency during operation is reduced. Specifically, the maximum rotation frequency during operation is reduced to, for example, 80% of the maximum rotation frequency in normal time. Furthermore, if abnormality is detected by the wear-detecting unit 202, the controller 200 notifies the maintenance contractor of the occurrence of abnormality. Since workers for the maintenance contractor are notified of the short remaining life of the compressor 100, the workers prepare a replacement compressor.

The number of air gaps 83 only needs to be plural but is desired to be three or more because of the following reason. In the result of frequency analysis for the vibration value or the current value, as described above, the first-order component of the rotation frequency f of the motor 4 is detected as a major peak. Therefore, if only a single air gap 83 is provided, the change in the vibration value or the current value that is caused by the presence or absence of the air gap 83 may be undetectable. Hence, it is desirable to provide three or more air gaps 83. Considering the reliability of the bearing 80, the number of air gaps 83 is desired to be six or less.

The object of frequency analysis may be either the vibration value or the current value. If both are subjected to frequency analysis, accuracy of failure detection increases. Specifically, if the results of frequency analysis for the vibration value and for the current value both contain anomalous peaks, respectively, at the frequency expressed as the number N of air gaps 83 times the rotation frequency f, it is determined that abnormality has occurred. Thus, a highly accurate detection result can be obtained, and increased accuracy of failure detection is achieved.

The above description relates to a case where only one of the main bearing 8a and the orbital bearing 8c is taken as the object of detection of abnormal abrasion. If which of the main bearing 8a and the orbital bearing 8c wears more easily is found in advance from the specifications and usage of the compressor 100, the plurality of air gaps 83 may be provided only to the one that wears more easily.

Advantageous Effects of Embodiment 1

The compressor system according to Embodiment 1 includes the compressor 100 including the bearing 80, the bearing 80 supporting the rotating shaft 7; the sensor configured to measure the index value correlated with the movement of the rotating shaft 7, the movement being made while the compressor 100 is in operation; and the wear-detecting unit 202 configured to detect the degree of wear of the bearing based on the measured value obtained by the sensor. The bearing 80 is a plain bearing and has the plurality of air gaps 83 arranged at intervals in the circumferential direction such that wear of the bearing 80 changes the positional relationship between the inner circumferential surface 82a of the bearing 80 and the plurality of air gaps 83 and eventually changes the shape of the inner circumferential surface of the bearing 80. The wear-detecting unit 202 detects the degree of wear of the bearing 80 based on the change in the measured value that is caused by the change in the shape of the inner circumferential surface of the bearing 80.

Thus, the degree of wear of the bearing 80 can be detected with a configuration realized by simply providing a plurality of air gaps 83 in the bearing 80. Since the degree of wear of the bearing 80 is detectable, abnormality can be detected in an early stage. Therefore, the compressor 100 can be replaced with a new one before the current compressor 100 completely stops working.

The radial distance from the inner circumferential surface of the bearing 80 to at least one of the plurality of air gaps 83 is set at the amount of tolerable wear that represents the limit of the amount of wear.

Thus, the occurrence of abnormal wear by an amount exceeding the amount of tolerable wear can be detected.

According to Embodiment 1, the bearing 80 includes the cylindrical backing metal part 81, and the cylindrical alloy part 82 provided on the inner side of the backing metal part 81. Furthermore, the plurality of air gaps 83 are provided in the outer circumferential surface of the alloy part 82.

With such a configuration, the bearing 80 having the plurality of air gaps 83 can be obtained.

The index value is the vibration value representing the vibration of the compressor or the current value representing the electric current flowing through the compressor.

That is, the vibration value or the current value can be used as the index value correlated with the movement of the rotating shaft 7 that is made while the compressor 100 is in operation.

Embodiment 2

Embodiment 2 relates to a configuration in which the bearing 80 has air gaps of a plurality of kinds that are different in the radial distance from the inner circumferential surface 82a of the bearing 80. Now, Embodiment 2 will be described, focusing on the difference from Embodiment 1.

Figure 7:
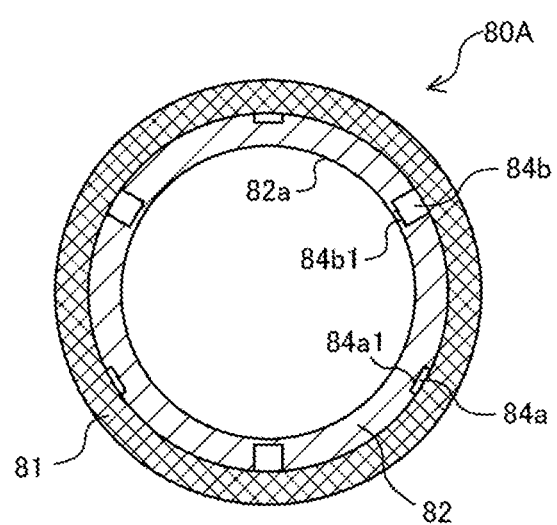
FIG. 7 is a schematic sectional view of a bearing included in a compressor according to Embodiment 2.
Figure 8:
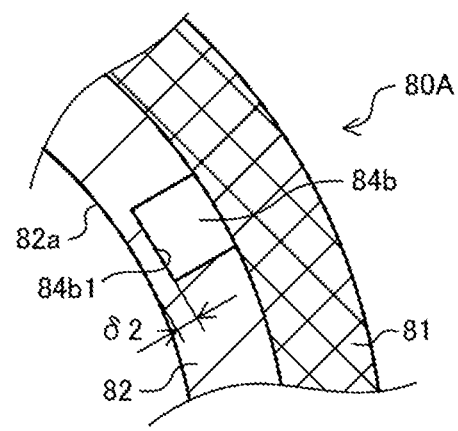
FIG. 8 is an enlarged sectional view of a part of FIG. 7, including a second air gap and peripheral elements.

FIG. 7 is a schematic sectional view of a bearing included in a compressor according to Embodiment 2. FIG. 8 is an enlarged sectional view of a part of FIG. 7, including a second air gap and peripheral elements.

The bearing, 80A, according to Embodiment 2 has first air gaps 84a and second air gaps 84b, which are of two kinds that are different in the distance from the inner circumferential surface of the bearing 80A. The first air gaps 84a and the second air gaps 84b are recesses provided in the outer circumferential surface of the alloy part 82 and having different depths, so that the distance from the inner circumferential surface of the bearing 80A varies. The distance between the bottom surface, 84a1, of each of the recesses forming the first air gaps 84a and the inner circumferential surface 82a is $\delta 1$, the same as in the case illustrated in FIG. 3. The distance between the bottom surface, 84b1, of each of the recesses forming the second air gaps 84b and the inner circumferential surface 82a is $\delta 2$, as illustrated in FIG. 8. The relationship between $\delta 1$ and $\delta 2$ is expressed as $\delta 1 > \delta 2$.

The first air gaps 84a and the second air gaps 84b are provided in equal number: three each in this case. The first air gaps 84a and the second air gaps 84b are arranged alternately and at regular intervals. That is, the air gaps of different kinds are arranged alternately among the different kinds and at regular intervals in the circumferential direction. In such an arrangement, the result of frequency analysis contains an anomalous peak at a frequency expressed as the number of air gaps times f.

Figure 9:
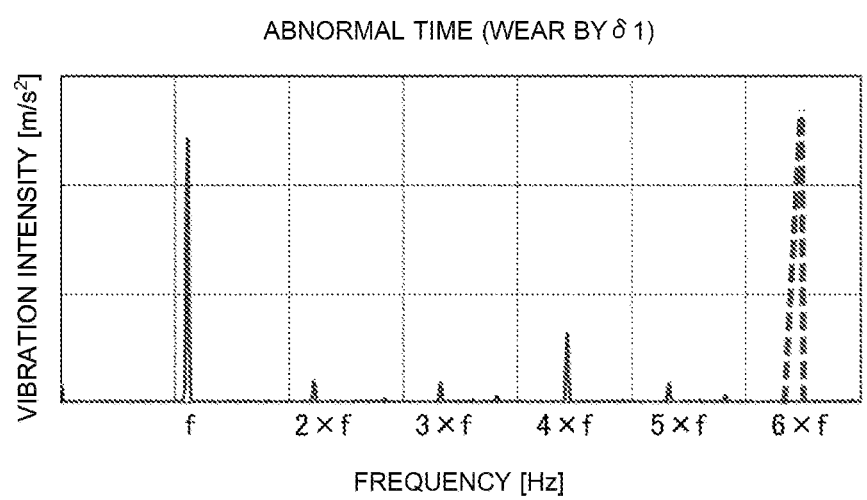
FIG. 9 exemplifies the result of frequency analysis at the occurrence of wear by an amount δ1 that is obtained by an analyzing unit included in a compressor system according to Embodiment 2.

FIG. 9 exemplifies the result of frequency analysis at the occurrence of wear by $\delta 1$ that is obtained by an analyzing unit included in a compressor system according to Embodiment 2.

If the amount of wear of the bearing 80A reaches $\delta 2$, as with the case of Embodiment 1, an anomalous peak appears at a frequency of 3×f as illustrated in FIG. 6. If the abrasion of the bearing 80A further progresses and the amount of abrasion reaches $\delta 1$, all of the six air gaps of the bearing 80A become continuous with the space on the inner side of the bearing 80A. Accordingly, an anomalous peak appears at a frequency of 64 as illustrated in FIG. 9.

Therefore, if it is known in advance that air gaps of two kinds that are different in the distance from the inner circumferential surface 82a of the bearing 80 are provided three each in the bearing 80A, it is found that a result of frequency analysis containing an anomalous peak at the frequency of 3×f indicates the occurrence of wear by $\delta 2$. It is also found that a result of frequency analysis containing an anomalous peak at the frequency of 6×f indicates the occurrence of wear by $\delta 1$.

While Embodiment 2 relates to a case where air gaps of two kinds are provided, air gaps of three or more kinds may be provided. In the latter case as well, the air gaps are provided in equal number for each of different kinds and are arranged alternately among the different kinds and at regular intervals in the circumferential direction. Thus, the occurrence of wear can be detected in the same manner as above.

Advantageous Effects of Embodiment 2

According to Embodiment 2, the same advantageous effects as those produced by Embodiment 1 are produced. In addition, the following advantageous effects are produced. In Embodiment 2, since the bearing 80A has the air gaps of two kinds that are different in depth, the progress of wear is detectable. Therefore, the degree of urgency for the replacement of the compressor can be found. In Embodiment 1 described above, the abnormal wear to be detected is of the amount of tolerable abrasion $\delta 1$. In such a situation, there is only a short time left before the compressor 100 completely stops working. Consequently, the compressor needs to be replaced urgently. In contrast, in Embodiment 2, the occurrence of wear by $\delta 2$, which is reached before the amount of tolerable abrasion $\delta 1$ is reached, is also detectable. Therefore, it is possible to find that there is still some time left before the time for replacement. Accordingly, for example, in a case where a plurality of compressors 100 are to be managed, if there are not enough replacement compressors, replacement can be done in order of priority.

Embodiment 3

Embodiment 3 relates to a case where both the main bearing 8a and the orbital bearing 8c are the objects of detection of abnormal abrasion. Now, Embodiment 3 will be described, focusing on the difference from Embodiment 1.

If both the main bearing 8a and the orbital bearing 8c are the objects of detection of abnormal abrasion, both the main bearing 8a and the orbital bearing 8c are provided with air gaps. It is preferable that the air gaps provided in the main bearing 8a be out of phase with the air gaps provided in the orbital bearing 8c. If the air gaps of the two are in phase with each other, the vibration is amplified, which reduces the reliability of the compressor 100.

Here, three patterns will be given for discussing the case where both the main bearing 8a and the orbital bearing 8c have the air gaps.

Pattern 1: A case where the main bearing 8a and the orbital bearing 8c have an equal number of air gaps Pattern 2: A case where the main bearing 8a and the orbital bearing 8c have different numbers of air gaps Pattern 3: A case where Embodiment 2 is applied such that the main bearing 8a and the orbital bearing 8c each have air gaps of two kinds that are different in depth (Pattern 1)

FIG. 10 summarizes a relationship, in Pattern 1, between the bearing having abnormality and the frequency having an anomalous peak to be identified by frequency analysis in a compressor system according to Embodiment 3.

Specifically, FIG. 10 summarizes a relationship between the bearing having abnormality and the frequency having an anomalous peak in a case where the main bearing 8a and the orbital bearing 8c each have an N number of air gaps that are out of phase with the air gaps of the other bearing.

Referring to FIG. 10, supposing that N is 3, for example, and that the phase of the air gaps is different between the two bearings, if abnormal abrasion occurs only in the main bearing 8a, an anomalous peak appears at a frequency of 3×f. Likewise, if abnormal abrasion occurs only in the orbital bearing 8c, an anomalous peak appears at the frequency of 3×f. If abnormal abrasion occurs in both the main bearing 8a and the orbital bearing 8c, an anomalous peak appears at a frequency of 2×3×f.

Accordingly, if the result of frequency analysis contains an anomalous peak at the frequency of 3×f, it is determined that either the main bearing 8a or the orbital bearing 8c has abnormality. If the result contains an anomalous peak at the frequency of 6f, it is determined that both the main bearing 8a and the orbital bearing 8c have abnormality.

(Pattern 2)

FIG. 11 summarizes a relationship, in Pattern 2, between the bearing having abnormality and the frequency having an anomalous peak to be identified by frequency analysis in the compressor system according to Embodiment 3. Specifically, FIG. 11 summarizes a relationship between the bearing having abnormality and the frequency having an anomalous peak in a case where the main bearing 8a has an N number of air gaps and the orbital bearing 8c has an M number of air gaps that are out of phase with the air gaps of the main bearing 8a.

The bearing having abnormality and the frequency having an anomalous peak have the relationship summarized in FIG. 11. Therefore, if an anomalous peak appears at a frequency of N×f, it is determined that the main bearing 8a has abnormality. If an anomalous peak appears at a frequency of M×f, it is determined that the orbital bearing 8c has abnormality. If anomalous peaks appear at both the frequency of N×f and the frequency of M×f, it is determined that both the main bearing 8a and the orbital bearing 8c have abnormality.

Thus, if the number of air gaps is made different between the main bearing 8a and the orbital bearing 8c as in Pattern 3, it is possible to find which of the main bearing 8a and the orbital bearing 8c has caused abnormal wear, that is, the position of wear.

(Pattern 3)

FIG. 12 summarizes a relationship, in Pattern 3, between the bearing having abnormality and the frequency having an anomalous peak to be identified by frequency analysis in the compressor system according to Embodiment 3. Specifically, FIG. 12 summarizes a relationship between the bearing having abnormality and the frequency having an anomalous peak in the following arrangement. The main bearing 8a has air gaps of two kinds that are different in depth: an N number of first air gaps 84a, and an N number of second air gaps 84b. The orbital bearing 8c has air gaps of two kinds that are different in depth: an M number of first air gaps 84a, and an M number of second air gaps 84b. In each of the main bearing 8a and the orbital bearing 8c, the air gaps of different kinds are arranged alternately between the different kinds and at regular intervals in the circumferential direction. Furthermore, the phase of the air gaps is different between the main bearing 8a and the orbital bearing 8c.

Pattern 3 is based on the same logic as for Patterns 1 and 2. There is a relationship summarized in FIG. 12. Since this relationship is known in advance, the position of wear and the progress of wear can be found. For example, if an anomalous peak appears only at a frequency of N×f, it is determined that wear by δ2 has occurred only in the main bearing 8a. If anomalous peaks appear at two frequencies of N×f and M×f, it is determined that wear by δ2 has occurred in both the main bearing 8a and the orbital bearing 8c. If anomalous peaks appear at frequencies of (2×N)×f and (2×M)×f, it is determined that abnormality with abrasion by δ1 has occurred in both the main bearing 8a and the orbital bearing 8c.

While Embodiment 3 relates to a case where air gaps of two kinds are provided, air gaps of three or more kinds may be provided. In the latter case as well, in each of the main bearing 8a and the orbital bearing 8c, the air gaps are provided in equal number for each of different kinds and are arranged alternately among the different kinds and at regular intervals in the circumferential direction. Thus, the occurrence of wear can be detected in the same manner as above.

Advantageous Effects of Embodiment 3

According to Embodiment 3, since both the main bearing 8a and the orbital bearing 8c have the air gaps, abnormality can be detected for both of the bearings.

Furthermore, since the number of air gaps is made different between the main bearing 8a and the orbital bearing 8c, it is possible to find which of the main bearing 8a and the orbital bearing 8c has caused abnormal wear, that is, the position of wear. Therefore, if the method of operating the refrigeration cycle apparatus is associated with the position of wear, the method of operating the refrigeration cycle apparatus can be adjusted such that the amount of wear is reduced. Such an operation method contributes to the increase in the reliability of the compressor 100. An exemplary operation is as follows. If the backflow of liquid refrigerant occurs, the wear of the orbital bearing 8c tends to progress faster. Therefore, if abnormal wear of the orbital bearing 8c is detected, the operation may be changed in such a manner as to prevent the backflow of liquid refrigerant.

In Embodiment 3, the number of air gaps is made different between the main bearing 8a and the orbital bearing 8c. Furthermore, the air gaps of each of the bearings are of a plurality of kinds that are different in depth but are equal in number. Furthermore, in each of the main bearing 8a and the orbital bearing 8c, the air gaps of different kinds are arranged alternately among the different kinds and at regular intervals in the circumferential direction. Thus, both the position of abrasion and the progress of abrasion can be detected.

Embodiment 4

Embodiment 4 relates to a case where air gaps are provided in the inner circumferential surface of the bearing. Now, Embodiment 4 will be described, focusing on the difference from Embodiment 1. Embodiment 4 relates to a case where one of the main bearing 8a and the orbital bearing 8c is the object of detection of abnormal abrasion.

Figure 13:
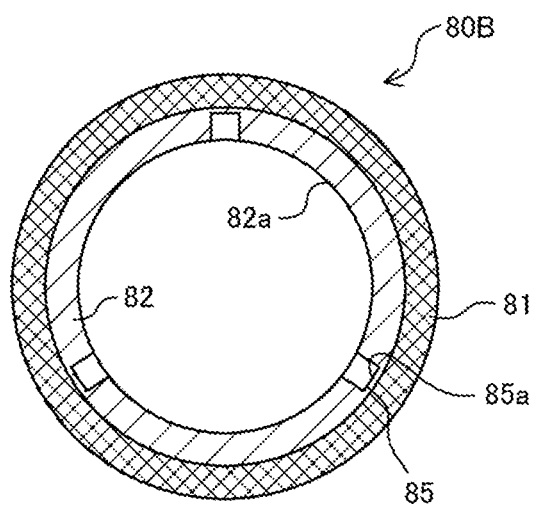
FIG. 13 is a schematic sectional view of a bearing included in a compressor system according to Embodiment 4.
Figure 14:
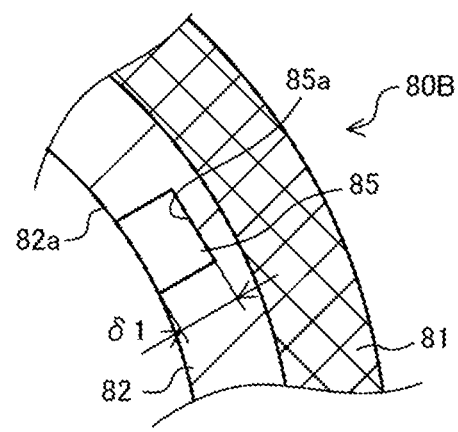
FIG. 14 is an enlarged schematic sectional view of a part of FIG. 13, including an air gap and peripheral elements.

FIG. 13 is a schematic sectional view of a bearing included in a compressor system according to Embodiment 4. FIG. 14 is an enlarged schematic sectional view of a part of FIG. 13, including an air gap and peripheral elements.

The bearing, 80B, according to Embodiment 4 has a plurality of air gaps 85 in the inner circumferential surface 82a thereof. The air gaps 85 are recesses provided in the inner circumferential surface 82a. Embodiment 4 relates to a case where the first distance 81 (see FIG. 14) between the bottom surface, 85a, of each of the recesses forming the air gaps 85 and the inner circumferential surface 82a of the bearing 80B is set at the amount of tolerable wear. Alternatively, the first distance may be set at δ2, which is shorter than δ1. The first distance between the bottom surface 85a of each of the recesses forming the air gaps 85 and the inner circumferential surface 82a of the bearing 80B may be set based on the degree of wear that is desired to be detected.

[Principle of Abnormal Abrasion Detection]

Figure 15:
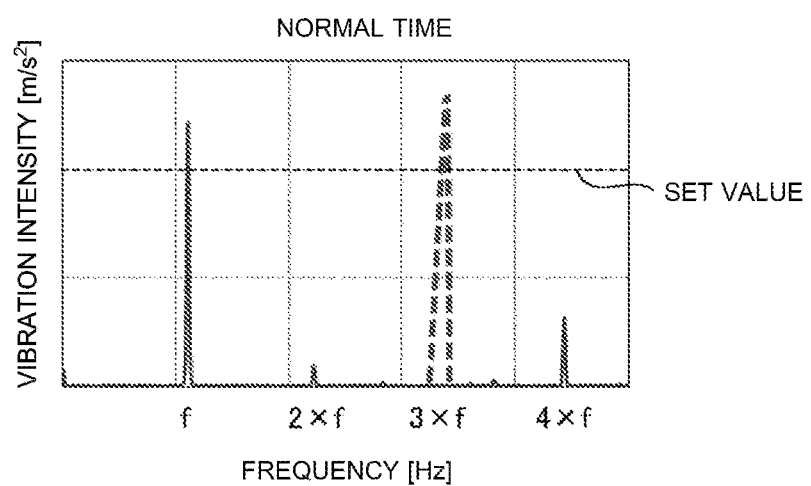
FIG. 15 exemplifies the result of frequency analysis in normal time in the compressor system according to Embodiment 4.
Figure 16:
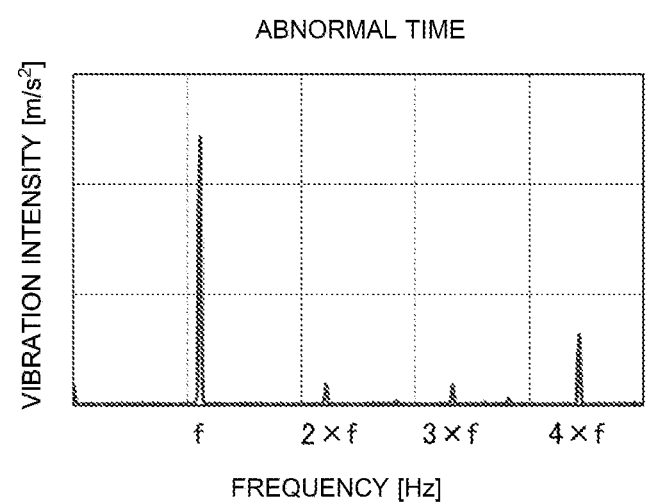
FIG. 16 exemplifies the result of frequency analysis in abnormal time in the compressor system according to Embodiment 4.

FIG. 15 exemplifies the result of frequency analysis in normal time in the compressor system according to Embodiment 4. FIG. 16 exemplifies the result of frequency analysis in abnormal time in the compressor system according to Embodiment 4. Embodiment 4 relates to a case where the bearing 80B has three air gaps 85.

In Embodiment 4, the three air gaps 85 are continuous with the space on the inner side of the bearing 80B in normal time. Therefore, as illustrated in FIG. 15, a normal peak exceeding a set value appears at a frequency of 3×f. With the progress of wear of the bearing 80, if the air gaps provided in the bearing 80B are reduced to be flash with the inner circumferential surface 82a of the bearing 80B over the entire circumference, the normal peak at the frequency of 3×f disappears as illustrated in FIG. 16. Therefore, if it is known in advance that the bearing 80B has three air gaps 85, it is found that a result of frequency analysis containing no peak exceeding the set value at the frequency of 3×f indicates the occurrence of abnormal wear.

Figure 18:
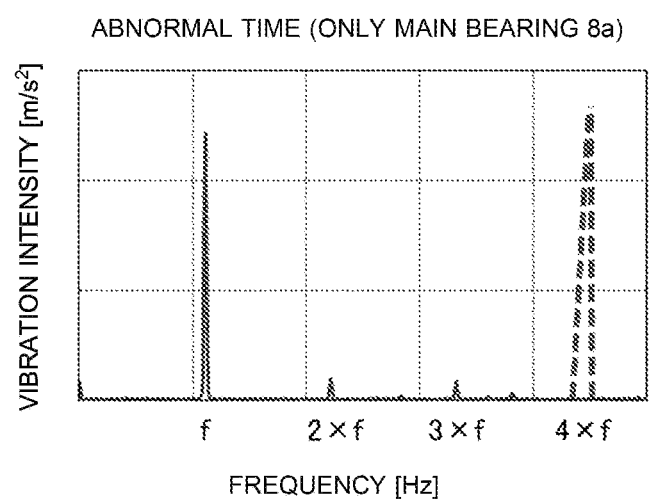
FIG. 18 illustrates the result of frequency analysis in a case where abnormal wear has occurred only in the main bearing in the compressor system according to Embodiment 4.
Figure 19:
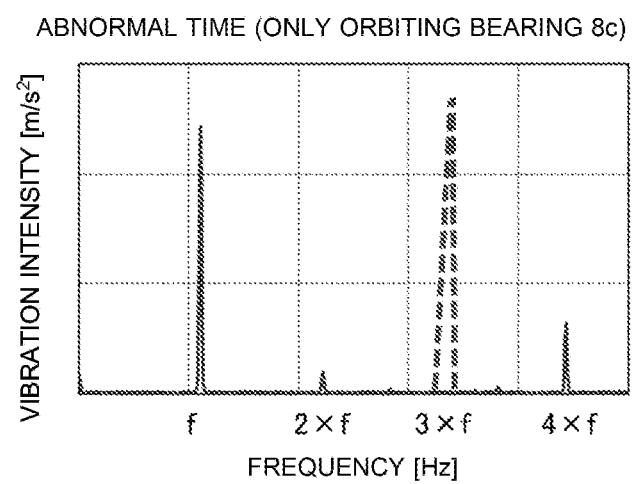
FIG. 19 illustrates the result of frequency analysis in a case where abnormal wear has occurred only in the orbital bearing in the compressor system according to Embodiment 4.

While the above description relates to a case where one of the main bearing 8a and the orbital bearing 8c is the object of detection of abnormal abrasion, the same detection of abnormality can be achieved in a case where both the main bearing 8a and the orbital bearing 8c are the objects of abnormal abrasion. In the latter case, the air gaps are provided in the inner circumferential surface of each of the main bearing 8a and the orbital bearing 8c. For example, if three air gaps are provided in the main bearing 8a and four air gaps are provided in the orbital bearing 8c, the results of frequency analysis in normal time and in abnormal time are as illustrated in FIGS. 17 to 19.

Figure 17:
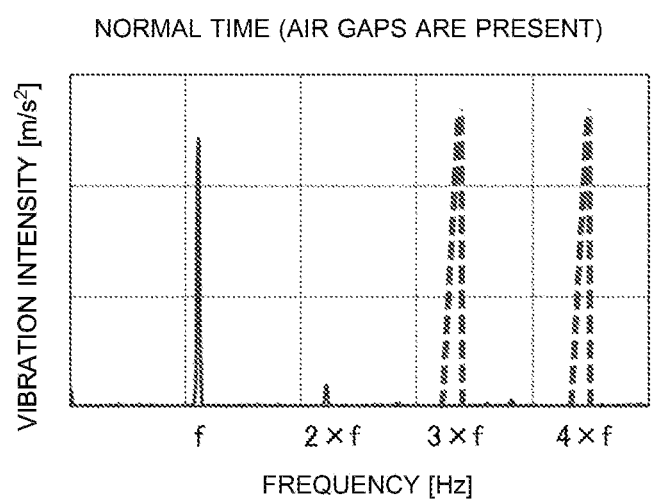
FIG. 17 exemplifies the result of frequency analysis in normal time in a case where air gaps are provided in both a main bearing and an orbital bearing in the compressor system according to Embodiment 4.

FIG. 17 exemplifies the result of frequency analysis in normal time in a case where the air gaps are provided in both the main bearing and the orbital bearing in the compressor system according to Embodiment 4. FIG. 18 illustrates the result of frequency analysis in a case where abnormal wear has occurred only in the main bearing in the compressor system according to Embodiment 4. FIG. 19 illustrates the result of frequency analysis in a case where abnormal wear has occurred only in the orbital bearing in the compressor system according to Embodiment 4.

As illustrated in FIG. 17, in normal time, normal peaks appear at a frequency of 34 and at a frequency of 4×f. If abnormal wear occurs only in the main bearing 8a, the result of frequency analysis illustrated in FIG. 18 is obtained. If abnormal wear occurs only in the orbital bearing 8c, the result of frequency analysis illustrated in FIG. 19 is obtained. Therefore, if it is known in advance that the main bearing 8a has three air gaps in the inner circumferential surface thereof and the orbital bearing 8c has four air gaps in the inner circumferential surface thereof, it is found that a result of frequency analysis containing no normal peak exceeding the set value at the frequency of 3×f as illustrated in FIG. 18 indicates the occurrence of abnormal wear in the main bearing 8a. It is also found that a result of frequency analysis containing no normal peak exceeding the set value at the frequency of 4×f indicates the occurrence of abnormal wear in the orbital bearing 8c.

Advantageous Effects of Embodiment 4

According to Embodiment 4, the same advantageous effects as those produced by Embodiment 1 are produced. In Embodiments 1 to 3, as the wear progresses, the wear-tolerable-thickness portion 82b becomes thinner. Therefore, unless the wear-tolerable-thickness portion 82b is designed appropriately, the wear-tolerable-thickness portion 82b that has received a bearing load may collapse into the air gaps before the amount of tolerable wear is reached. In such a situation, an anomalous peak may appear before the amount of tolerable wear is reached. Consequently, abnormal abrasion cannot be detected accurately. In view of such a situation, Embodiment 4 does not employ the wear-tolerable-thickness portion 82b. Therefore, the above collapse can be avoided, and abnormal abrasion can be detected accurately.

Embodiment 5

Embodiment 5 relates to a refrigeration cycle apparatus including the compressor system according to any of Embodiments 1 to 4.

Figure 20:
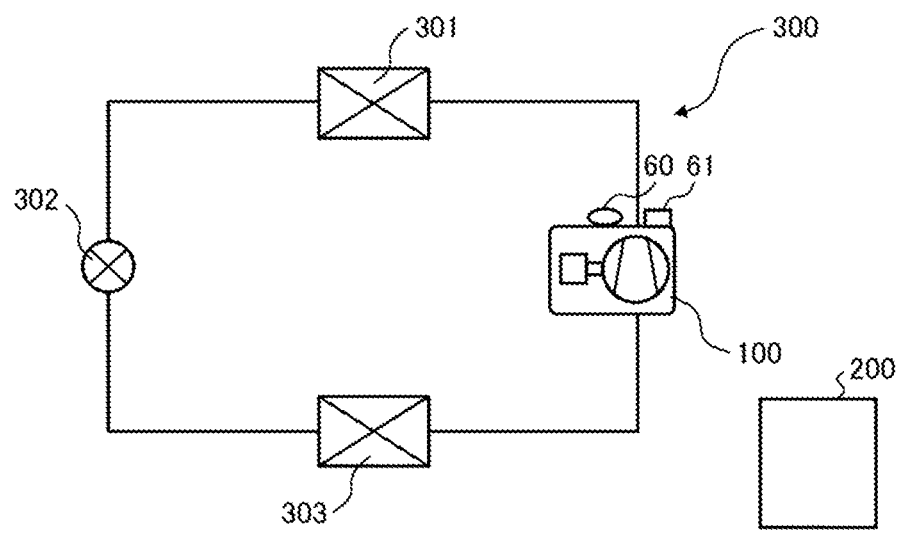
FIG. 20 illustrates a refrigerant circuit of a refrigeration cycle apparatus according to Embodiment 5.

FIG. 20 illustrates a refrigerant circuit of a refrigeration cycle apparatus according to Embodiment 5.

The refrigeration cycle apparatus, 300, includes the compressor system according to any of Embodiments 1 to 4. Specifically, the refrigeration cycle apparatus 300 includes the compressor 100, a condenser 301, an expansion valve 302, serving as a decompressor, and an evaporator 303. Gas refrigerant discharged from the compressor 100 of the compressor system flows into the condenser 301, exchanges heat with air flowing through the condenser 301, thereby turning into high-pressure liquid refrigerant to be discharged. The high-pressure liquid refrigerant discharged from the condenser 301 is decompressed by the expansion valve 302, thereby turning into low-pressure two-phase gas-liquid refrigerant to flow into the evaporator 303. The low-pressure two-phase gas-liquid refrigerant having flowed into the evaporator 303 exchanges heat with air flowing through the evaporator 303, thereby turning into low-pressure gas refrigerant. The low-pressure gas refrigerant is suctioned into the compressor 100 again.

Since the refrigeration cycle apparatus 300 configured as above includes the compressor system according to any of Embodiments 1 to 4, abnormality in the compressor 100 can be detected in an early stage. Accordingly, the compressor can be replaced with a new one before the current compressor completely stops working. Such a configuration prevents the occurrence of a situation where the refrigeration cycle stops working to make the customer suffer from disadvantageous effects.

The refrigeration cycle apparatus 300 is applicable to apparatuses such as a refrigerator, a freezer, a vending machine, an air-conditioning apparatus, and a water heater.

REFERENCE SIGNS LIST

2: shell, 2a: upper shell, 2b: lower shell, 2c: middle shell, 3: oil pump, 3a: oil sump, 4: motor, 4a: rotor, 4b: stator, 5: compressing mechanism unit, 5a: compression chamber, 6: frame, 6a: suction port, 6b: thrust bearing, 6c: oil-feeding groove, 6d: internal space, 6f: frequency, 7: rotating shaft, 7a: oil passage, 8a: main bearing, 8b: counterbearing, 8c: orbital bearing, 11: suction pipe, 12: discharge pipe, 13: discharge chamber, 15: Oldham ring, 15a: Oldham groove, 15b: Oldham groove, 16: slider, 17: sleeve, 18: first balancer, 18a: balancer cover, 19: second balancer, 20: sub frame, 21: oil-draining pipe, 30: fixed scroll, 30a: end plate, 31: scroll portion, 32: outlet, 32a: open end, 40: orbiting scroll, 40a: end plate, 41: scroll portion, 50: discharge valve mechanism, 51: reed valve, 52: valve seat, 53: reed valve retainer, 60: vibration sensor, 61: current sensor, 70: power-supplying unit, 71: power source, 80: bearing, 80A: bearing, 80: bearing, 81: backing metal part, 82: alloy part, 82a: inner circumferential surface, 82b: wear-tolerable-thickness portion, 83: air gap, 83a: bottom surface, 84a: first air gap, 84a1: bottom surface, 84b: second air gap, 84b1: bottom surface, 85: air gap, 85a: bottom surface, 100: compressor, 200: controller, 201: analyzing unit, 202: wear-detecting unit, 300: refrigeration cycle apparatus, 301: condenser, 302: expansion valve, 303: evaporator

The invention claimed is:

1. A compressor system comprising:
a compressor including a bearing, the bearing supporting a rotating shaft;
a sensor configured to measure an index value correlated with a movement of the rotating shaft, the movement of the rotating shaft being made while the compressor is in operation; and
a controller configured to detect a degree of wear of the bearing based on the measured index value obtained by the sensor,
wherein the bearing is a plain bearing, and the bearing includes a cylindrical backing metal part and a cylindrical alloy part provided on an inner side of the cylindrical backing metal part and has a plurality of air gaps provided in an outer circumferential surface of the cylindrical alloy part of the bearing and arranged at intervals in a circumferential direction of the bearing such that the degree of wear of the bearing changes a positional relationship between an inner circumferential surface of the bearing and the plurality of air gaps and eventually changes a shape of the inner circumferential surface of the bearing, and
wherein the controller is configured to detect the degree of wear of the bearing based on a change in the measured index value that is caused by a change in the shape of the inner circumferential surface of the bearing.

2. The compressor system of claim 1, wherein the plurality of air gaps are of a plurality of kinds, wherein each kind of the plurality of kinds has a different distance from the inner circumferential surface of the bearing.

3. The compressor system of claim 2, wherein the plurality of air gaps of the plurality of kinds are arranged alternately among the plurality of kinds and at regular intervals in the circumferential direction.

4. The compressor system of claim 1, wherein a radial distance from the inner circumferential surface of the bearing to at least one of the plurality of air gaps is set at an amount of tolerable wear that represents a limit of an amount of wear.

5. The compressor system of claim 1,
wherein the bearing includes a main bearing and an orbital bearing that support the rotating shaft at respective positions, the positions being different from each other, and
wherein the main bearing and the orbital bearing each have the plurality of air gaps.

6. The compressor system of claim 5, wherein the main bearing and the orbital bearing have a different number of the plurality of air gaps.

7. The compressor system of claim 5,
wherein the plurality of air gaps are of a plurality of kinds, wherein each kind of the plurality of kinds has a different distance from the inner circumferential surface of the bearing, and
wherein the plurality of air gaps of the main bearing are provided in equal number for each of the plurality of kinds, the plurality of air gaps of the orbital bearing are provided in equal number for each of the plurality of kinds, and the plurality of air gaps of the plurality of kinds in each of the main bearing and the orbital bearing are arranged alternately among the plurality of kinds and at regular intervals in the circumferential direction.

8. The compressor system of claim 1, wherein the measured index value is a vibration value representing vibration of the compressor or a current value representing an electric current flowing through the compressor.

9. A compressor comprising a bearing, the bearing supporting a rotating shaft,
wherein the bearing is a plain bearing, and the bearing includes a cylindrical backing metal part and a cylindrical alloy part provided on an inner side of the cylindrical backing metal part and has a plurality of air gaps provided in an outer circumferential surface of the cylindrical alloy part and arranged at intervals in a circumferential direction such that wear of the bearing changes a positional relationship between an inner circumferential surface of the bearing and the plurality of air gaps and eventually changes a shape of the inner circumferential surface of the bearing.

10. The compressor of claim 9, wherein the plurality of air gaps are of a plurality of kinds, wherein each kind of the plurality of kinds has a different distance from the inner circumferential surface of the bearing.

11. The compressor of claim 10, wherein the plurality of air gaps of the plurality of kinds are arranged alternately among the plurality of kinds and at regular intervals in the circumferential direction.

12. The compressor of claim 9, wherein a radial distance from the inner circumferential surface of the bearing to at least one of the plurality of air gaps is set at an amount of tolerable wear that represents a limit of an amount of wear.

13. The compressor of claim 9,
wherein the bearing includes a main bearing and an orbital bearing that support the rotating shaft at respective positions, the positions being different from each other, and
wherein the main bearing and the orbital bearing each have the plurality of air gaps.

14. The compressor of claim 13, wherein the main bearing and the orbital bearing have a different number of the plurality of air gaps.

15. The compressor of claim 13,
wherein the plurality of air gaps are of a plurality of kinds, wherein each kind of the plurality of kinds has a different distance from the inner circumferential surface of the bearing, and
wherein the plurality of air gaps of the main bearing are provided in equal number for each of the plurality of kinds, the plurality of air gaps of the orbital bearing are provided in equal number for each of the plurality of kinds, and the plurality of air gaps of the plurality of kinds in each of the main bearing and the orbital bearing are arranged alternately among the plurality of kinds and at regular intervals in the circumferential direction.

16. A refrigeration cycle apparatus comprising the compressor system of claim 1.

* * * * *